Sept. 29, 1959 G. F. MONTGOMERY 2,906,968

TRANSISTOR-CONTROLLED REACTANCE MODULATOR

Filed Dec. 27, 1957 2 Sheets-Sheet 1

INVENTOR

George Franklin Montgomery

BY Arthur Vinograd
Leonard F. Stoll

ATTORNEYS

TRANSISTOR-CONTROLLED REACTANCE MODULATOR

Filed Dec. 27, 1957

INVENTOR
George Franklin Montgomery
BY Arthur Vinograd
Leonard F. Stoll
ATTORNEYS United States Patent Office 2,906,968

Patented Sept. 29, 1959

2,906,968

TRANSISTOR-CONTROLLED REACTANCE MODULATOR

George Franklin Montgomery, Washington, D.C., assignor to the United States of America as represented by the Secretary of Commerce Application December 27, 1957, Serial No. 705,723

2 Claims. (Cl. 332—16)

This invention relates to frequency modulation systems and particularly contemplates an improvement in a diode type of reactance modulator whereby a transistor is used as a control amplifier to produce a reactance modulator of high sensitivity; that is, a modulator having a large ratio of reactance variation to control-voltage or control-current variations.

The principle of operation and construction of diode reactance modulators are well known and are described, for example, in U. S. Patents 2,610,318 and 2,708,739.

In accordance with the principles of the present invention the control amplifier is essentially self-powered when used with semiconductor diodes in the reactance modulator circuit. The necessary supply power for the transistors and diodes is derived from the A.C. power in the circuit the reactance of which is to be varied; no other power is necessary except for the input control power.

It is accordingly an immediate object of the present invention to provide an improved diode reactance modulator employing a transistor control amplifier, to produce a reactance modulator of high sensitivity.

Another object of this invention is to provide a reactance modulator having a large ratio of reactance variation to control-voltage or control-current variation.

It is a still further object of the present invention to provide a control amplifier for use in connection with a diode reactance modulator which requires no external or additional source of power.

Other uses and advantages of the invention will become apparent upon reference to the specification and drawings in which.

The construction and operation of diode reactance modulators are well known and are described for example in U.S. Patents 2,610,318 and 2,708,739 issued to Clark and Butcher, respectively. Accordingly a detailed analysis of the diode reactance modulator is not believed necessary toward an understanding of the present invention.

Figure 1:
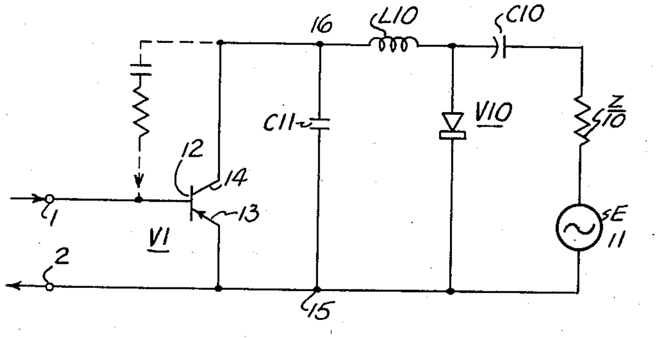
Fig. 1 shows an embodiment of the present invention in connection with a single diode reactance modulator.
Figure 5:
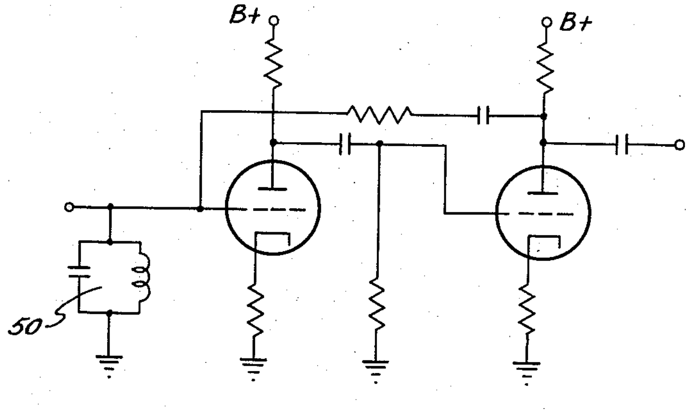
Fig. 5 shows a typical oscillator such as may be employed in connection with a frequency modulator.

Fig. 1 shows an illustrative embodiment of the invention as applied to a single-diode modulator and employing a single-control transistor. The reactance modulator portion of the circuit shown in Fig. 1 comprises an inductance L10, a capacitor C11, an asymmetrical conducting device such as diode V10, a capacitor C10, the impedance Z symbolized as element 10 and a voltage source 11. Element 10 representing an impedance Z and voltage source 11 representing voltage E symbolize the equivalent circuit of a conventional oscillator. Specifically, the impedance member 10 represents the tank circuit of an oscillator such as the L–C circuit 50 comprising the tank circuit of an oscillator shown in Fig. 5. The equivalent generator voltage of such circuit may be represented by E and it will be clear from Fig. 1 that a suitable D.C. voltage will accordingly be generated and manifested across the terminals of capacitor C11. Such voltage provides a suitable power source for the transistor V1 which is employed as an amplifier for the input signal.

Input terminals 1 and 2 in Fig. 1 represent the input from a source of variable D.C. where the D.C. variation may, for example, be generated by a transducer such as a microphone. Transistor V1 serves to amplify such signal and apply it to the reactance modulator including the diode V10. The emitter 13 of the transistor is shown connected to terminal 15 of the reactance modulator while the collector 14 is connected to terminal 16. The base 12 is connected to one input terminal 1. The transistor in effect is connected as a grounded emitter transistor amplifier.

Figure 2:
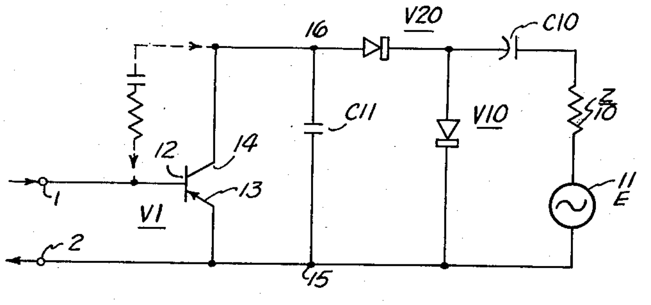
Fig. 2 shows the invention employed in a dual-diode reactance modulator circuit.

Fig. 2 shows an embodiment of the invention employed with a dual diode type of reactance modulator. The circuit of Fig. 2 is otherwise the same as Fig. 1. In Fig. 2 element 10 represents the impedance. Element 10 having an impedance Z represents the tank circuit of the referred-to oscillator while element 11 represents the equivalent voltage generated by the oscillator in the same manner as Fig. 1. The diode modulator of Fig. 2 in addition to the capacitors C10 and C11 which correspond to like elements in Fig. 1 includes a first and second diode V10 and V20, respectively. The transistor V1 is connected to the reactance modulator portion of a circuit in the same manner as described in connection with Fig. 1.

Figure 3:
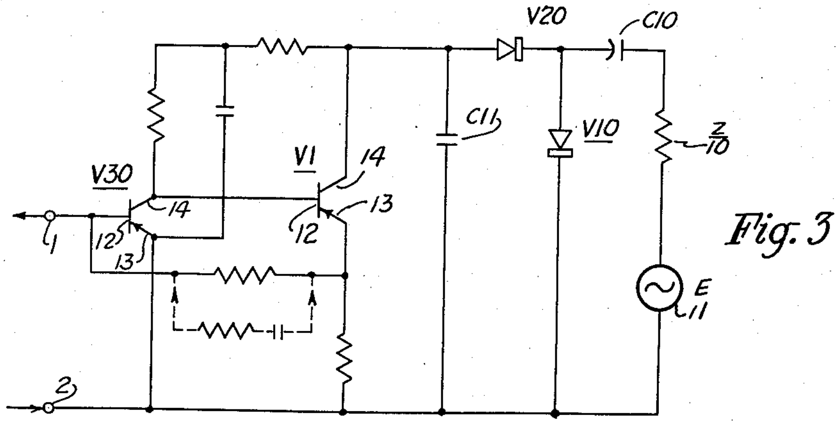
Fig. 3 is an embodiment of the invention similar to Fig. 2 but employing a cascaded-transistor amplifier.

A further modification of the invention is shown in Fig. 3 in which a dual diode type of reactance modulator is shown, a cascaded-transistor amplifier arrangement being employed instead of the single transistor amplifier of Figs. 1 and 2. In Fig. 3 transistors V1 and V30 are connected in cascade to the reactance modulator. Each transistor is powered by the referred-to voltage source generated across capacitor C11.

The transistor employed in each modification is a conventional P-N-P junction transistor.

The elements shown with dotted connections in Figs. 1–3 can be added to provide greater linearity between reactance change and control current variations if desired.

In addition to frequency modulation the apparatus of the present invention also has utility for phase modulation of an amplifier, automatic frequency control, and other equivalent uses.

Figure 4:
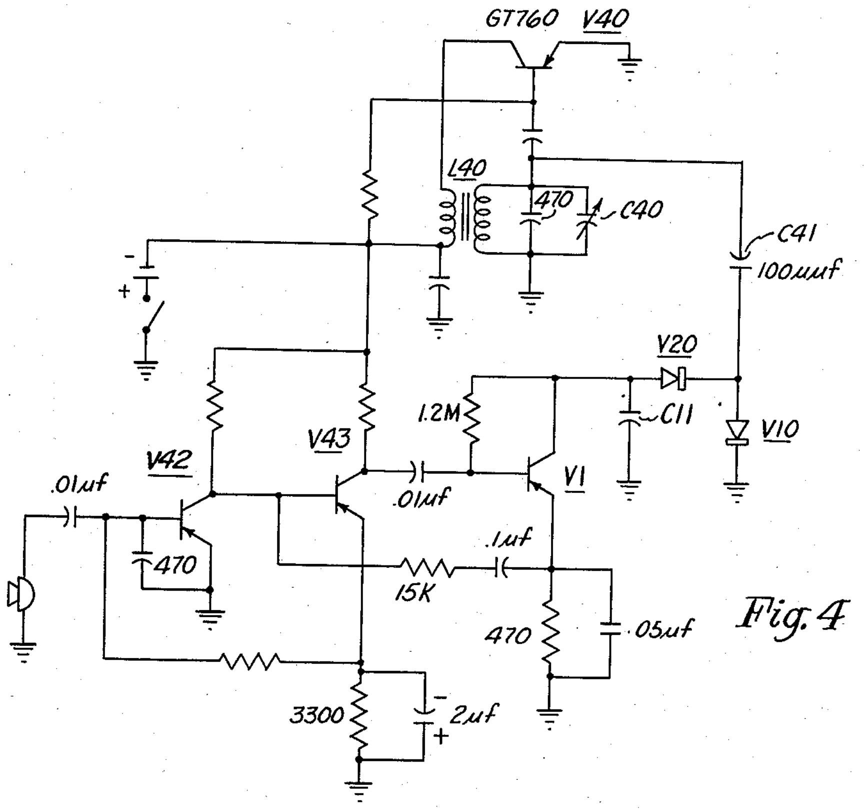
Fig. 4 shows the invention incorporated in a short range transmitter.

Fig. 4 shows the manner in which the present invention may be integrated with an oscillator in connection with a transmitter. The circuit shown in Fig. 4 is for a short-range transmitter operating at a frequency of approximately 500 kc. The transmitter tank circuit consists of a coil L40 wound on a ferrite rod and an associated tuning capacitor C40. Power is delivered to the tank circuit by a transistor V40 operating as an oscillator at approximately 500 kc. The reactance modulator comprises the diodes V10, V20 which control the R-F current through a 100-M.M.F. capacitor C41 which is shunted across the tank circuit.

The control amplifier corresponding to the transistor amplifier V1 shown and described in connection with Figs. 1 and 2 is indicated in Fig. 4 connected to the diode reactance modulator. A plurality of cascaded-transistor amplifiers V42, V43 are also provided for the audio signal introduced through transducer M. Accordingly the varying direct current through diodes V20 and V10 is controlled by the audio current delivered to amplifier V1. A change in such direct current produces an approximately linear change of the susceptance of the tank circuit comprising the inductance L40 and capacitor C40. The transmitter oscillator will therefore be frequency modulated by the audio signal. The remaining portions of the circuit shown in Fig. 4 are considered apparent and the specific values of the components manifested in Fig. 4 would readily enable any one skilled in the art to reproduce the circuit. It will be noted from Fig. 4 that the D.C. source 40 for the transmitter oscillator also provides the necessary power for operation of the control amplifier V1. Thus, as described in connection with the modifications of Figs. 1–3, the apparatus of the present invention as embodied in the circuit of Fig. 4 derives its sole operating power from the oscillator circuit with which it is associated.

It will be apparent that the embodiments shown are only exemplary and that various modifications can be made in construction and arrangement within the scope of invention as defined in the appended claims.

What is claimed is:

1. A reactance modulator for controlling the frequency of an oscillator, said oscillator consisting of a frequency-determining tank circuit and a source of operating power, comprising: asymmetrical conducting means, impedance means coupling said asymmetrical conducting means to said tank circuit, a D.C. power source comprising a capacitor shunting said asymmetrical conducting means for storing the rectified signal generated across said asymmetrical conducting means by said oscillator as a D.C. voltage, a source of control signals and a control amplifier comprising a junction transistor, means connecting the emitter and base electrodes of said transistor to said signal source and means connecting the emitter and collector electrodes of said junction transistor to opposite terminals respectively of said capacitor with polarity such that the D.C. voltage developed across said capacitor by said asymmetrical conducting means provides the operating power for said junction transistor amplifier.

2. The invention of claim 1 in which said asymmetrical conducting means comprises a first diode connected across said oscillator tank circuit and a second diode connected in series with said tank circuit.

References Cited in the file of this patent

UNITED STATES PATENTS

| | | |
|---|---|---|
| 2,486,776 | Barney | Nov. 1, 1949 |
| 2,510,026 | Sproull | May 30, 1950 |
| 2,610,318 | Clark | Sept. 9, 1952 |
| 2,771,584 | Thomas | Nov. 20, 1956 |
| 2,777,057 | Pankove | Jan. 8, 1957 |